United States Patent [19]
Gōhr et al.

[11] Patent Number: 6,071,108
[45] Date of Patent: Jun. 6, 2000

[54] ADJUSTABLE MOLD FOR INJECTION-MOLDING SYSTEM

[75] Inventors: Kurt Gōhr, Attendorn; Wolfgang Erner, Iserlohn, both of Germany

[73] Assignee: Schade GmbH & Co. KG, Plettenberg, Germany

[21] Appl. No.: 09/074,966

[22] Filed: May 8, 1998

[30]        Foreign Application Priority Data

May 8, 1997 [DE]    Germany ............................ 197 19 314

[51] Int. Cl.[7] .................................................. B29C 45/14
[52] U.S. Cl. ............................ 425/116; 249/83; 264/252; 425/129.1
[58] Field of Search ...................................... 264/252, 261, 264/328.1; 425/110, 116, 117, 129.1, 542, 544; 249/83, 85

[56]              References Cited

U.S. PATENT DOCUMENTS

| | | | |
|---|---|---|---|
| 4,584,155 | 4/1986 | Zanella | 425/117 |
| 4,626,185 | 12/1986 | Monnet | 264/252 |
| 5,061,429 | 10/1991 | Yoshihara et al. | 425/116 |
| 5,196,210 | 3/1993 | Yoshihara et al. | 425/116 |
| 5,268,183 | 12/1993 | Garza | 264/252 |
| 5,344,603 | 9/1994 | Jardin et al. | 264/252 |

FOREIGN PATENT DOCUMENTS 32 16 063   11/1984   Germany .

*Primary Examiner*—Mathieu D. Vargot
*Attorney, Agent, or Firm*—Herbert Dubno; Andrew Wilford

[57]              ABSTRACT

An injection-molding mold has a pair of mold parts each in turn having a generally annular outer edge and a generally annular inner edge directed in a closing direction. The mold parts fit together on closing in the direction with a workpiece between them and with the outer edges engaging each other and the inner edges engaging opposite faces of the workpiece. The inner edges form with the outer edges an annular compartment containing an outer periphery of the workpiece engaged between the inner edges and one of the mold parts is formed with a port opening into the compartment. In accordance with the invention a body forming at least part of one of the inner edges is movable on the respective mold part in the closing direction, and structure is provided for displacing the body in the closing direction away from the respective mold part for engagement with the workpiece on closing of the mold and for positioning the body in the direction relative to the respective mold part.

3 Claims, 5 Drawing Sheets

ADJUSTABLE MOLD FOR INJECTION-MOLDING SYSTEM

FIELD OF THE INVENTION

The present invention relates to a mold. More particularly this invention concerns the injection molding of a plastic body on a workpiece held in the mold.

BACKGROUND OF THE INVENTION

A standard mold for an injection-molding system has at least two mold parts or halves and even a slide that when fitted together form a closed compartment. A port formed in one of the mold parts opens into the compartment and serves for introduction of a fluent but hardenable synthetic resin into it. The mold parts and any slide that might be provided fit together at carefully machined edges that are perfectly complementary to each other so that the pressurized resin in the compartment cannot leak out between these edges.

In the system described in German patent 3,216,063 of Strunk a system is described for molding an annular plastic bead around the edge of a sheet of glass, as used for instance in a motor vehicle. To this end the mold parts have two pairs of annular ridges or edges, one within the other, that define an annular compartment. The outer pair of edges engage each other as in a standard mold, but the inner pair engage opposite faces of the workpiece directly across from each other.

Thus with this system the fit of the edges is extremely critical. Both pairs of edges must fit perfectly to prevent leakage from the annular compartment around the edge of the workpiece. With time, however, the outer pair of edges can wear so that the inner pair will grip the workpiece too tightly and possibly break it, or alternately the outer edges will not meet properly and a leak will occur. Thus it is standard, after a certain number of uses, to have to remachine the mold parts to reform the critical sealing edges.

OBJECTS OF THE INVENTION

It is therefore an object of the present invention to provide an improved mold for an injection-molding system.

Another object is the provision of such an improved mold for an injection-molding system which overcomes the above-given disadvantages, that is which has an extremely long service life without leaks.

SUMMARY OF THE INVENTION

An injection-molding mold has a pair of mold parts each in turn having a generally annular edge directed in a closing direction. The mold parts fit together on closing in a closing direction with the edges engaging each other and forming in a closed condition of the mold a compartment. One of the mold parts is formed with a port opening into the compartment. According to the invention a body forming at least part of the edge is movable on the respective mold half in the closing direction and can be displaced and positioned in the closing direction.

More particularly according to the invention the mold has a pair of mold parts each in turn having a generally annular outer edge and a generally annular inner edge directed in a closing direction. The mold parts fit together on closing in the direction with a workpiece between them and with the outer edges engaging each other and the inner edges engaging opposite faces of the workpiece. The inner edges form with the outer edges an annular compartment containing an outer periphery of the workpiece engaged between the inner edges and one of the mold parts is formed with a port opening into the compartment. In accordance with the invention a body forming at least part of one of the inner edges is movable on the respective mold part in the closing direction, and structure is provided for displacing the body in the closing direction away from the respective mold part for engagement with the workpiece on closing of the mold and for positioning the body in the direction relative to the respective mold part.

In a simple embodiment the body is an elastically compressible seal ring carried on the respective mold part. Alternately it can be comprised of a row of closely spaced stiff rods extending in the closing direction and each having an outer end engageable with the workpiece and an inner end and an elastically deformably strip in which the inner ends are imbedded.

When the one inner edge is generally polygonal and has straight sections meeting at corners, each straight section is formed by a respective such body. The respective mold part has relatively incompressible inserts forming the one edge at the corners.

In a more complex version of the instant invention the body is formed by a plurality of closely spaced fingers having ends bearing on the workpiece. The other of the inner edges is unitarily formed with the respective mold part and is relatively incompressible in the direction. The fingers extend generally parallel to each other and transverse to the closing direction and are so closely spaced that the relatively viscous molten resin will not flow between them. Such elastically deformable spring-steel fingers can readily conform, for instance, to the nonplanar contours of a motor-vehicle windshield. Thus no leakage will occur when a seal bead is unitarily formed on the outside edge of the windshield for a modern-day flush-glazed installation. The system can be so accurate that subsequent trimming of the workpiece is wholly eliminated.

The structure positioning the fingers can include relatively incompressible spacers between the fingers and the respective mold part. These spacers can be wedges. Alternately the spacers are screws extending in the direction and threaded into the respective mold part. Each finger is L-shaped with a long leg having an inner end anchored in the respective mold part and a short leg projecting in the direction toward the workpiece.

According to the invention respective workpiece holders are set in the mold parts adjacent the inner edges. They can be expanded in the direction to press the holders elastically against the workpiece. More specifically the holders are tubular and elastically deformable and the means for expanding includes means for inflating the tubular holders. Each mold part is formed immediately inward of the respective inner edge with a groove open in the direction toward the other mold part and the tubular holders sit in the respective grooves. Such holders can readily accommodate nonplanar workpieces.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION

Figure 1:
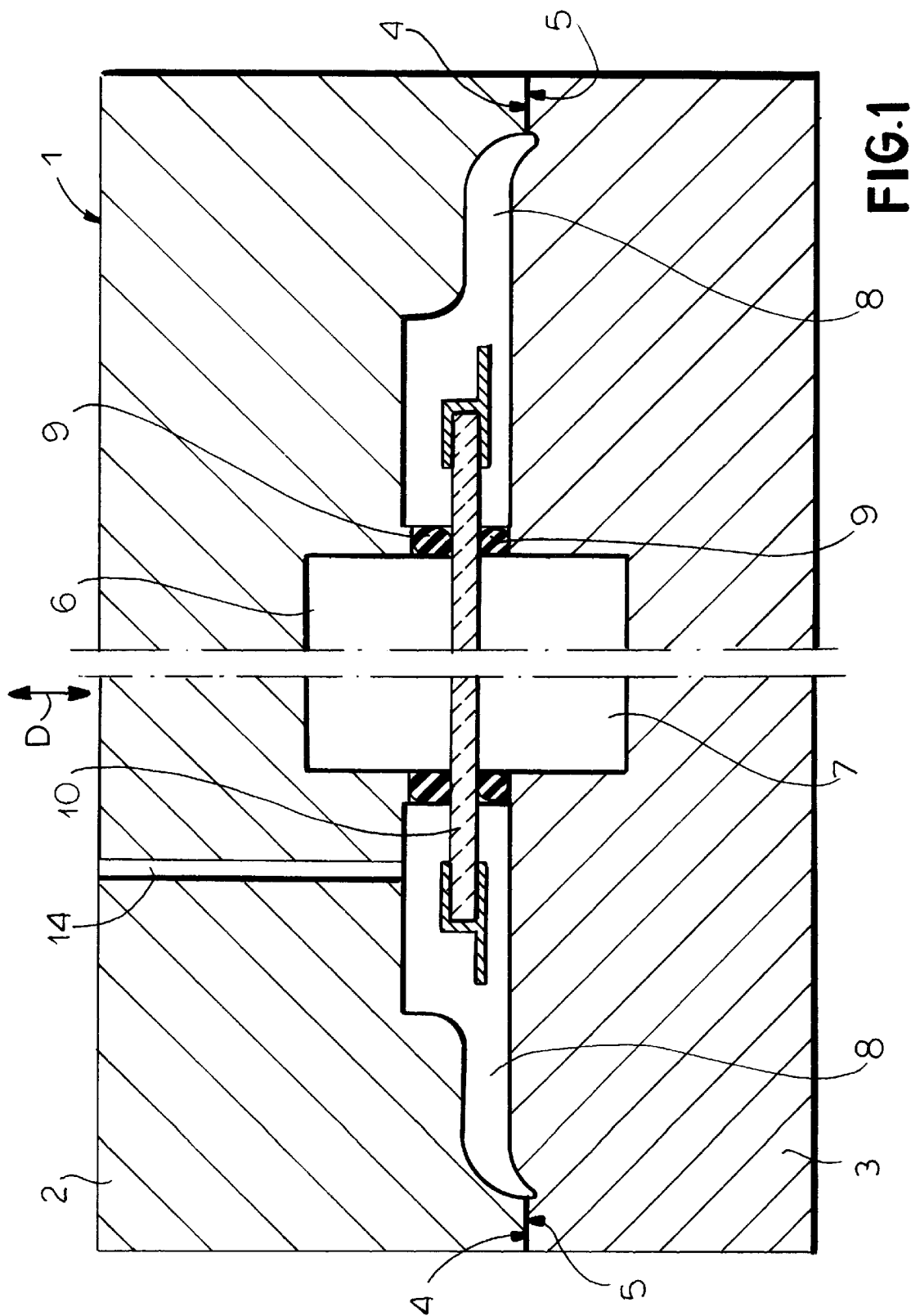
FIG. 1 is a section through a mold according to the invention.

As seen in a simple embodiment of the invention shown in FIG. 1, a mold 1 is formed of a pair of mold halves 2 and 3 unitarily formed with annular outer rims or edges 4 and 5 that meet complementarily. A workpiece 10, here a glass plate with edge trimming, is engaged between a pair of inner annular edges 9 of the parts 2 and 3 so as to define a pair of central compartments 6 and 7 flanking the workpiece plate 10 and an annular peripheral compartment 8 in which an outer edge of the workpiece 10 is suspended. An inlet port 14 is provided for injecting fluent hardenable plastic into the outer compartment 8.

According to the invention the annular edges 9 are formed by soft elastomeric rings that, therefore, are height adjustable in a direction D in which the mold 1 is opened and closed. Thus even if the outer edges 4 and 5 wear, good contact will continue both where the edges 9 meet the workpiece 10 and where the edges 4 and 5 meet each other.

Figure 2:
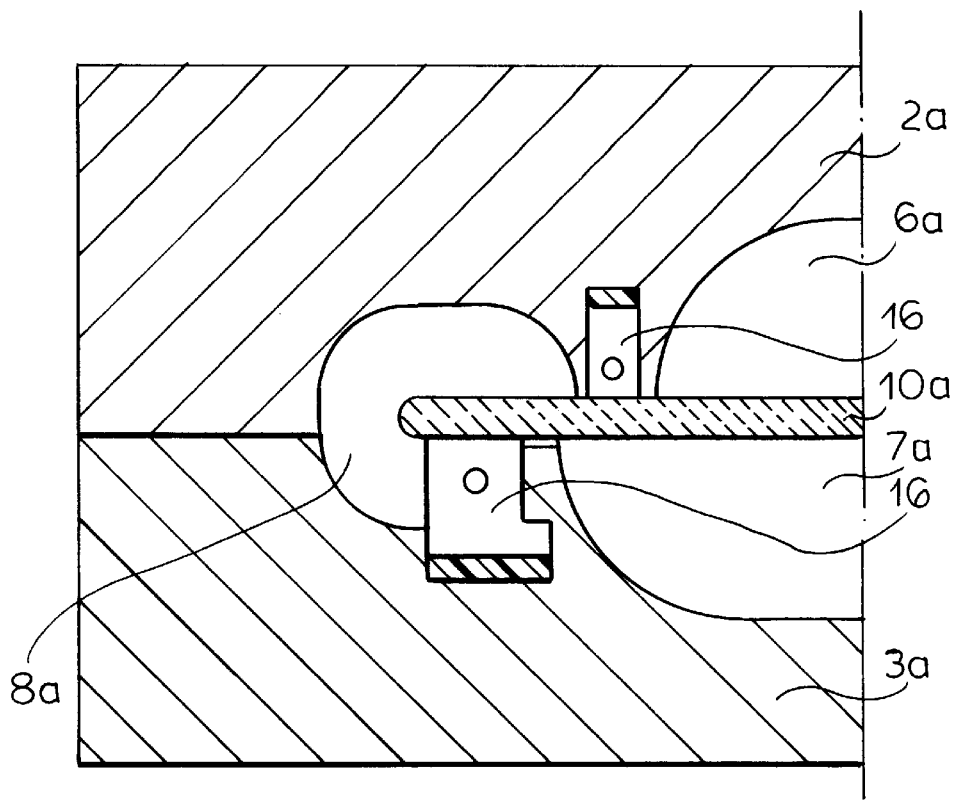
FIG. 2 is a section through a detail of another mold in accordance with the invention.
Figure 4:
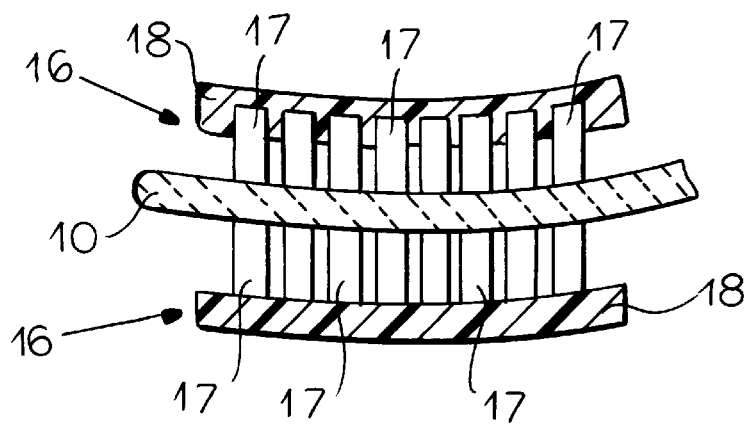
FIG. 4 is a partly sectional side view of a detail of FIG. 2.

FIGS. 2 and 4 show another arrangement where a pair of mold halves 2a and 3a define a pair of central compartments 6a and 7a flanking a workpiece 10a and an annular peripheral compartment 8a around an edge of the workpiece 10a. Here the mold-half edges defining the inner periphery of the outer compartment 8a are each formed by a strip 16 constituted as a plurality of rods 17 extending parallel to the mold opening and closing direction D and having outer ends seated in an elastomeric strip 18 set in a complementary groove of the respective mold half 2a or 3a. The outer ends of the rods 17 engage the workpiece and can easily follow an arcuate shape as clearly shown in FIG. 4. The spacing between adjacent rods 17 is shown exaggerated in FIG. 4; actually it is so narrow that molten plastic cannot flow between them.

Figure 3:
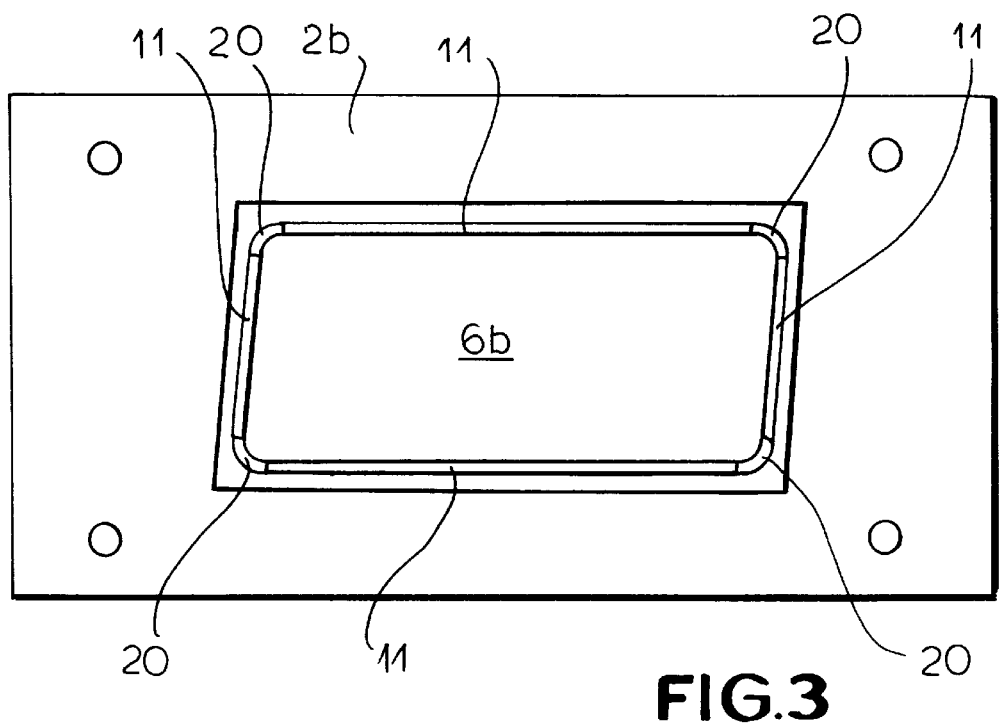
FIG. 3 is a small-scale bottom view of a top mold half according to the invention.

In FIG. 3 a mold half 2b forms a central compartment 6b whose inner edge is defined by a plurality of height-adjustable straight sections 11 meeting at corner angles or elbows 20. In this arrangement the facing edge is unitarily formed with the respective unillustrated mold part.

The system of FIGS. 5 through 9, which can be used to form the edges 11 of FIG. 3, has an upper inner edge 9c formed unitarily with the upper mold part 2c combined as usual with a lower mold part 3c to embrace a workpiece 10c and form inner compartments 6c and 7c and an outer compartment 8c shown here after being filled with plastic. The facing edge is formed by the outer ends of a plurality of L-shaped spring steel fingers 12 whose inner ends are unitary with a strip 19 screwed solidly to the respective mold half 3c, with the long legs of the L-shaped fingers 12 extending parallel to the workpiece 10c. Thus these fingers 12 are elastically deflectable perpendicular to the workpiece 10c but their outer ends are so closely juxtaposed that plastic will not flow significantly between them.

Immediately inward of the edge 9c or the edge 11 formed by the fingers 12 is a respective tubular seal or holder element 21 that can be inflated by a blower or pump shown schematically at 22 to solidly grip the workpiece 10c. These tubular seals 21 are shown in their unpressurized condition in which they are basically of rectangular section. When inflated, their faces turned toward the workpiece 10c bow outward to elastically and solidly engage opposite faces of this workpiece 10c.

Figure 5:
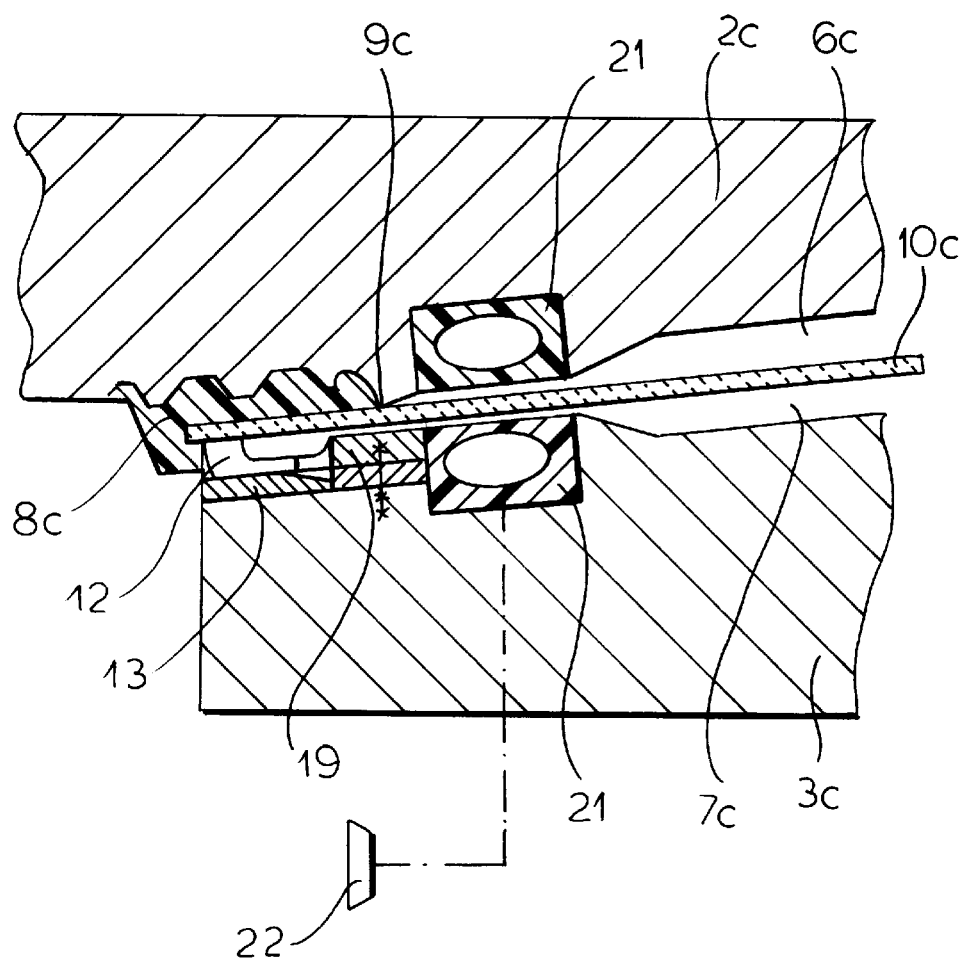
FIG. 5 is a section through a detail of yet another mold in accordance with the invention.
Figure 6:
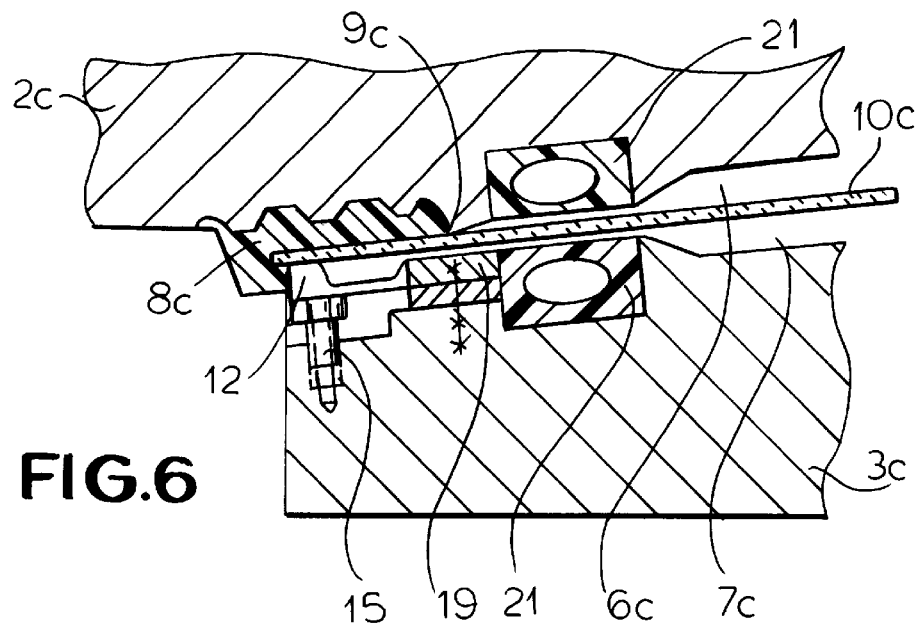
FIG. 6 is a view showing a variant on the system of FIG. 5.
Figure 7:
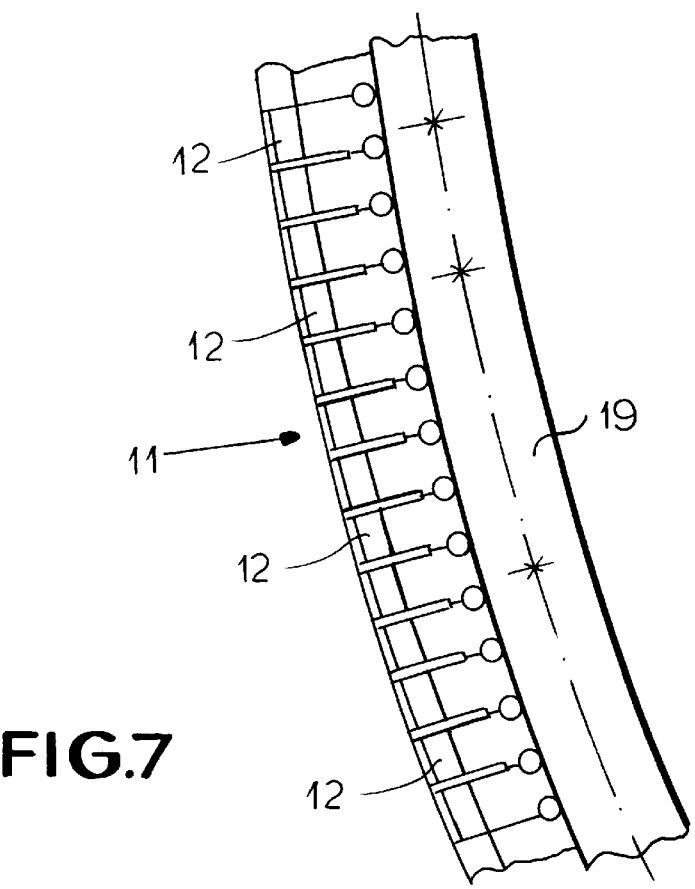
FIG. 7 is a top view of a part of the system of FIG. 6.
Figure 8:
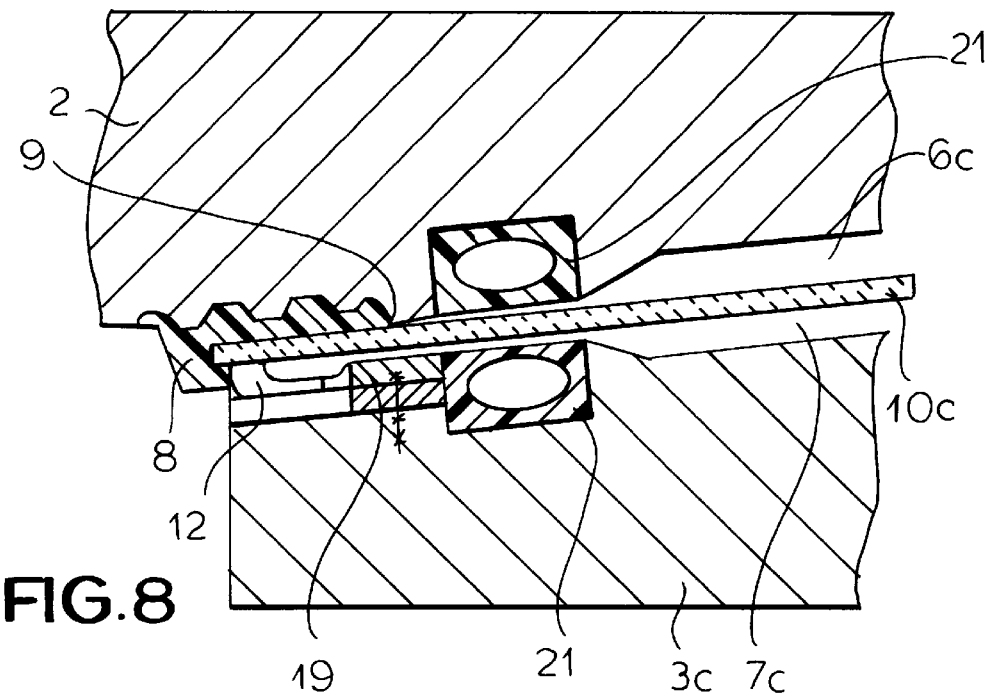
FIG. 8 is a view like FIG. 6 of another system according to the invention.
Figure 9:
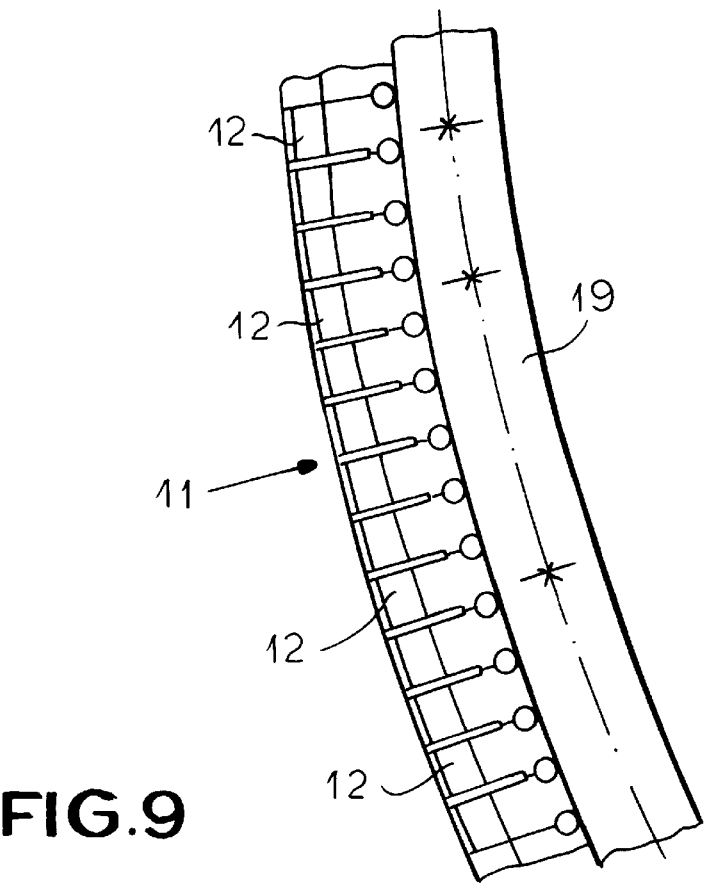
FIG. 9 is a top view of a part of the system of FIG. 8.

In FIG. 5 the fingers 12 are urged against the workpiece 10c by wedges 13 forced between them and the confronting peripheral face of the mold half 3c. In FIG. 6 a row of screws 14 sunk into the lower mold half 3c can be screwed in and out to adjust the height of the outer ends of the fingers 2c, thereby adjusting the fit with the workpiece 10c. FIG. 8 shows that the fingers 12 merely float, urged elastically against the workpiece face.

We claim:

1. An injection-molding mold comprising:

a pair of mold parts each in turn having a generally annular outer edge and a generally annular inner edge directed in a closing direction, the mold parts fitting together on closing in the direction with a workpiece between them and with the outer edges engaging each other and the inner edges engaging opposite faces of the workpiece, the inner edges forming with the outer edges an annular compartment containing an outer periphery of the workpiece engaged between the inner edges, one of the mold parts being formed with a port opening into the compartment;

a row of closely spaced stiff rods extending in the closing direction from at least part of one of the inner edges and each having an outer end engageable with the workpiece and an inner end; and an elastically deformable strip in which the inner ends are imbedded.

2. The injection-molding mold defined in claim 1 wherein the rods are so closely spaced that molten plastic filling the compartment cannot pass between them.

3. The injection-molding mold defined in claim 1 wherein the one inner edge is generally polygonal and has straight sections meeting at corners, each straight section being formed by a respective such body, the respective mold part having relatively incompressible inserts forming the one edge at the corners.

* * * * *